(12) United States Patent
Fink

(10) Patent No.: US 10,826,721 B2
(45) Date of Patent: Nov. 3, 2020

(54) METHOD OF OPERATING A NETWORK WITH A MULTI-MASTER REDUNDANCY PROTOCOL

(71) Applicant: HIRSCHMANN AUTOMATION AND CONTROL GMBH, Neckartenzlingen (DE)

(72) Inventor: Heiko Fink, Schwieberdingen (DE)

(73) Assignee: HIRSCHMANN AUTOMATION AND CONTROL GMBH, Neckartenzlingen (DE)

(*) Notice: Subject to any disclaimer, the term of this patent is extended or adjusted under 35 U.S.C. 154(b) by 0 days.

(21) Appl. No.: 15/571,205

(22) PCT Filed: Jun. 3, 2016

(86) PCT No.: PCT/EP2016/062685
§ 371 (c)(1),
(2) Date: Nov. 26, 2017

(87) PCT Pub. No.: WO2016/193450
PCT Pub. Date: Dec. 8, 2016

(65) Prior Publication Data
US 2018/0115437 A1    Apr. 26, 2018

(30) Foreign Application Priority Data
Jun. 3, 2015 (DE) .................. 10 2015 210 304

(51) Int. Cl.
*H04L 12/437* (2006.01)
*H04L 12/24* (2006.01)

(52) U.S. Cl.
CPC ........ *H04L 12/437* (2013.01); *H04L 41/0654* (2013.01)

(58) Field of Classification Search
CPC .......................... H04L 12/437; H04L 41/0654
USPC ......................................................... 370/223
See application file for complete search history.

(56) References Cited

U.S. PATENT DOCUMENTS

| | | | |
|---|---|---|---|
| 6,680,903 B1 * | 1/2004 | Moriguchi | H04L 12/437 370/216 |
| 7,894,326 B2 | 2/2011 | Monse | |
| 2004/0047360 A1 * | 3/2004 | Myers | H04L 12/4637 370/406 |
| 2004/0139179 A1 * | 7/2004 | Beyda | H04L 45/02 709/221 |
| 2011/0145433 A1 | 6/2011 | Noel | |

FOREIGN PATENT DOCUMENTS

WO       2013034188 A      3/2013

* cited by examiner

*Primary Examiner* — Chi Tang P Cheng
(74) *Attorney, Agent, or Firm* — Andrew Wilford

(57) ABSTRACT

The invention relates to a method for operating a network (1) with a multi-master redundancy protocol and an additional redundancy function by means of a bypass switch, wherein a plurality of network devices (2 to 5) are interconnected in the network (1) in a ring topology by means of lines (8) and exchange data. In the event of failure of one of the network devices (2 to 5), two ports of the failed network device (2 to 5) are connected to one another on the physical plane by means of a bypass switch (6, 7).

2 Claims, 2 Drawing Sheets

METHOD OF OPERATING A NETWORK WITH A MULTI-MASTER REDUNDANCY PROTOCOL

CROSS REFERENCE TO RELATED APPLICATIONS

This application is the US-national stage of PCT application PCT/EP2016/062685 filed 3 Jun. 2016 and claiming the priority of German patent application 102015210304.8 itself filed 3 Jun. 2015.

FIELD OF THE INVENTION

The invention relates to a method of operating a network with a multi-master redundancy protocol with an additional redundancy function, where a plurality of network devices are interconnected in the network in a ring topology by lines and exchange data among one another.

BACKGROUND OF THE INVENTION

Networks in which a plurality of network devices in a ring topology are interconnected via lines and exchange data among one another are inherently known. Since disruptions can occur on the network during its operation (for example, failure of a network device, interruption of a line, or the like), various redundancy functions have already become known.

Especially preferred redundancy processes are multi-master redundancy protocols that are preferably used in automation technology and are inherently known. Through the use of these known redundancy processes, the downtime upon switching from one network device that was previously the master to another network device that becomes the new master is shortened. However, heightened redundancy demands are placed on network applications, so that the reaction times and reliability are not yet sufficient if the network device malfunctions that is the master.

OBJECT OF THE INVENTION

It is therefore the object of the invention to provide a method of improving the operation of a network in terms of reaction times and reliability in the event of a breakdown.

SUMMARY OF THE INVENTION

This object is achieved according to the invention in that, if one of the network devices that was previously configured as the master for the redundancy function breaks down, two ports of the malfunctioning network device are connected at the physical level by a bypass switch. This offers the advantage that the lines that are connected to the respective ports are thus connected through, so that, despite the breakdown of the network device (previous master), the ring topology remains intact and sufficient time is available to set another network device as a master that was previously not a master by means of the multi-master redundancy function, that is, by means of a suitable redundancy protocol. Once this has occurred, the interconnection of the two ports of the malfunctioning network device is eliminated, thereby advantageously preventing a closed loop from forming on the network or the connection closed by the interconnection of the two ports and the resulting loop from being eliminated in order to prevent permanent circulation of data on the network.

BRIEF DESCRIPTION OF THE DRAWING

The method according to the invention for operating a network according to a multi-master redundancy protocol, particularly a device-level ring protocol (DLR), is explained in the following and described with reference to the figures, in which.

DETAILED DESCRIPTION OF THE INVENTION

Figure 1:
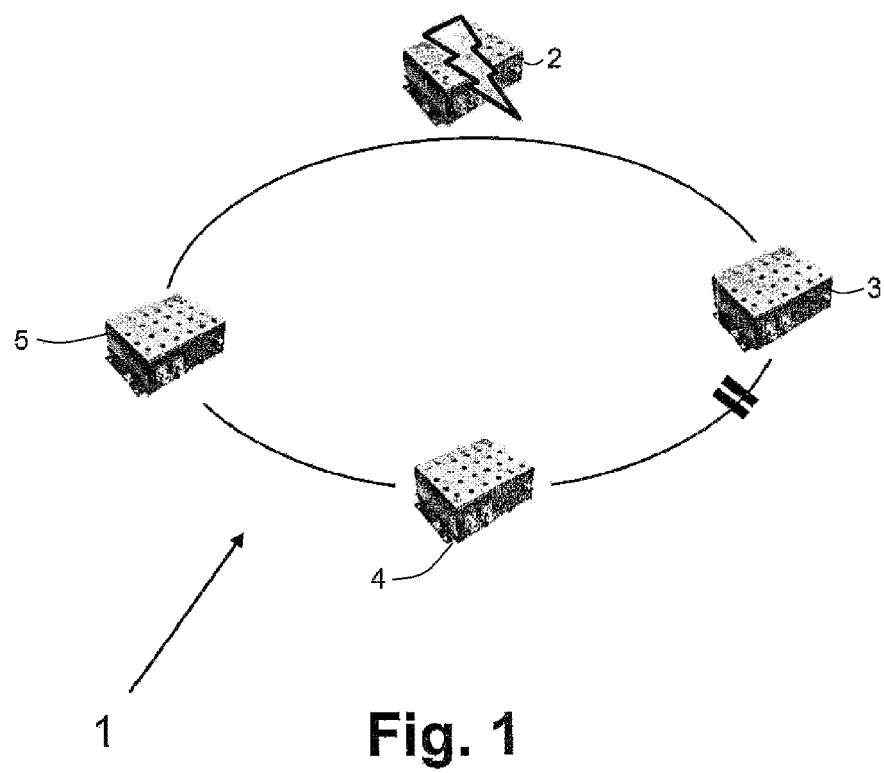
FIGS. 1-3 are schematic views of a network in various failure/connection modes.

FIG. 1 shows in detail a network 1 in a ring topology in which a plurality of network devices 2 to 5 of the same or different type are arranged. The network devices 2 to 5 are switches, routers, or the like.

The starting point is a network 1 in a ring topology in which the network devices 2 to 5 (or also fewer or more than four network devices than in this embodiment) are interconnected via lines and exchange data among one another. While FIG. 1 already shows that the network device 2 previously serving as master for the multi-master redundancy for the network and the bypass switch (see FIG. 4) is shut down, in this embodiment the network device 2 is normally first the master for the redundancy function and the other network devices 3 to 5 are not masters but backup masters via the multi-master redundancy protocol. FIG. 1 now shows that the previous old active master, namely the network device 2, has malfunctioned and is therefore no longer suitable for carrying out its function on the network 1. It is thus shown as malfunctioning and having been cut off from the network 1. In this case, another network device—here, the network device 3—was used according to the multi-master redundancy protocol as the new active master, while the two other network devices 4, 5 are used as backup masters. By virtue of a closed bypass switch in the network device 2, the multi-master redundancy remains capable of redundancy and can compensate for malfunctions of other masters.

Figure 2:
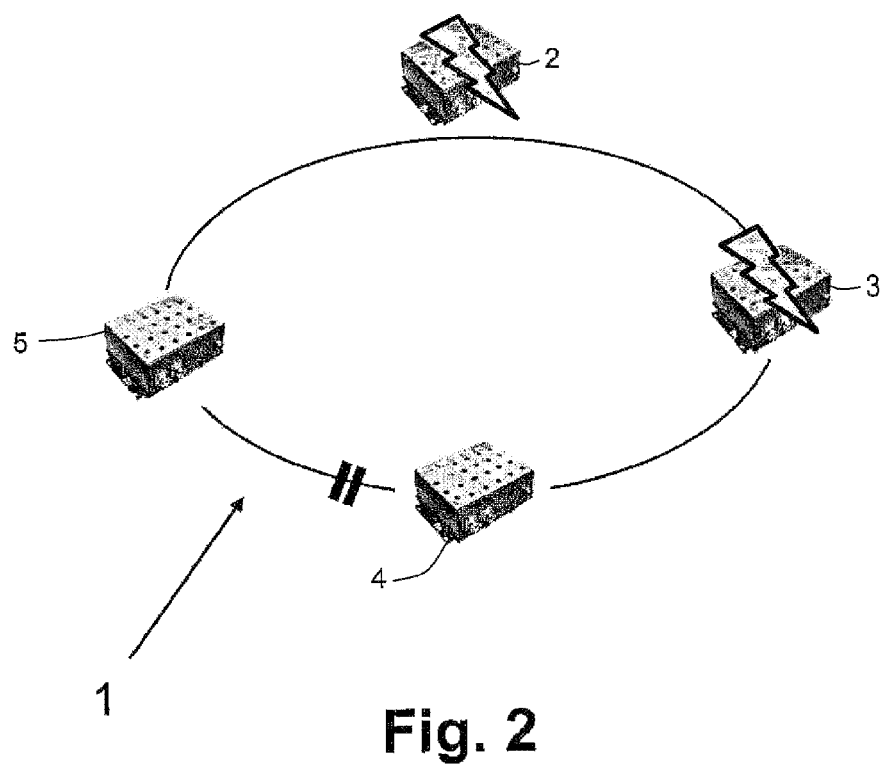

Taking the configuration of FIG. 1 as a point of departure, FIG. 2 shows that the new master, namely the network device 3, has malfunctioned and the network device 4 has been selected and is being used as the new active master. In this case, the other network device 5 does not need to act as a backup master. By virtue of the closed bypass switch in the network device 3, the multi-master redundancy remains capable of redundancy and can compensate for malfunctions of other masters.

Figure 3:
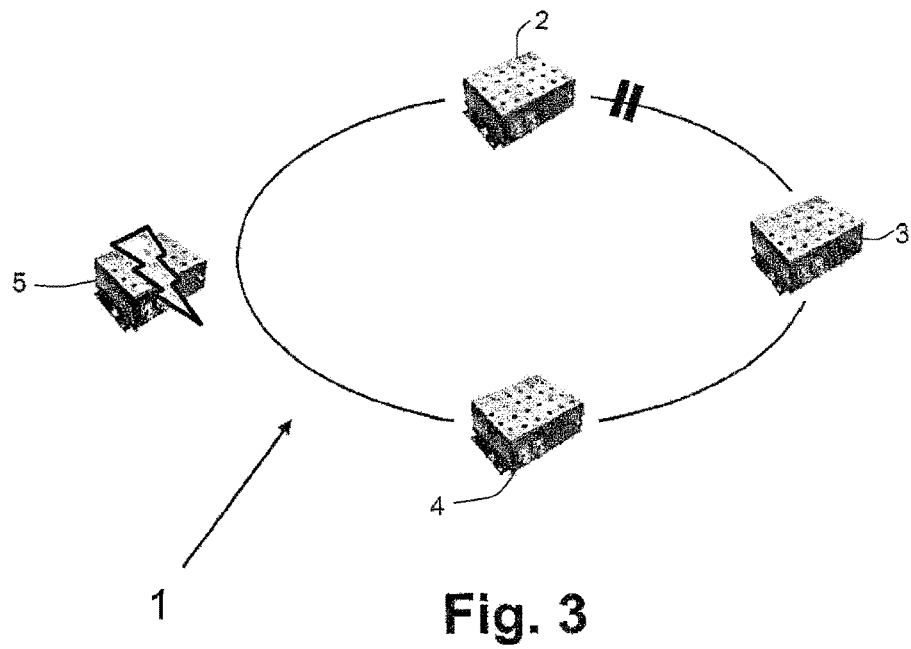

FIG. 3 shows a situation in which one of the backup masters, here the network device 5, has malfunctioned and the network device 2 that malfunctioned according to FIG. 1 has already been replaced by a new device that is now the active master. By virtue of the closed bypass switch of the network device 5, the multi-master redundancy remains capable of redundancy and can compensate for malfunctions of other masters.

Figure 4:
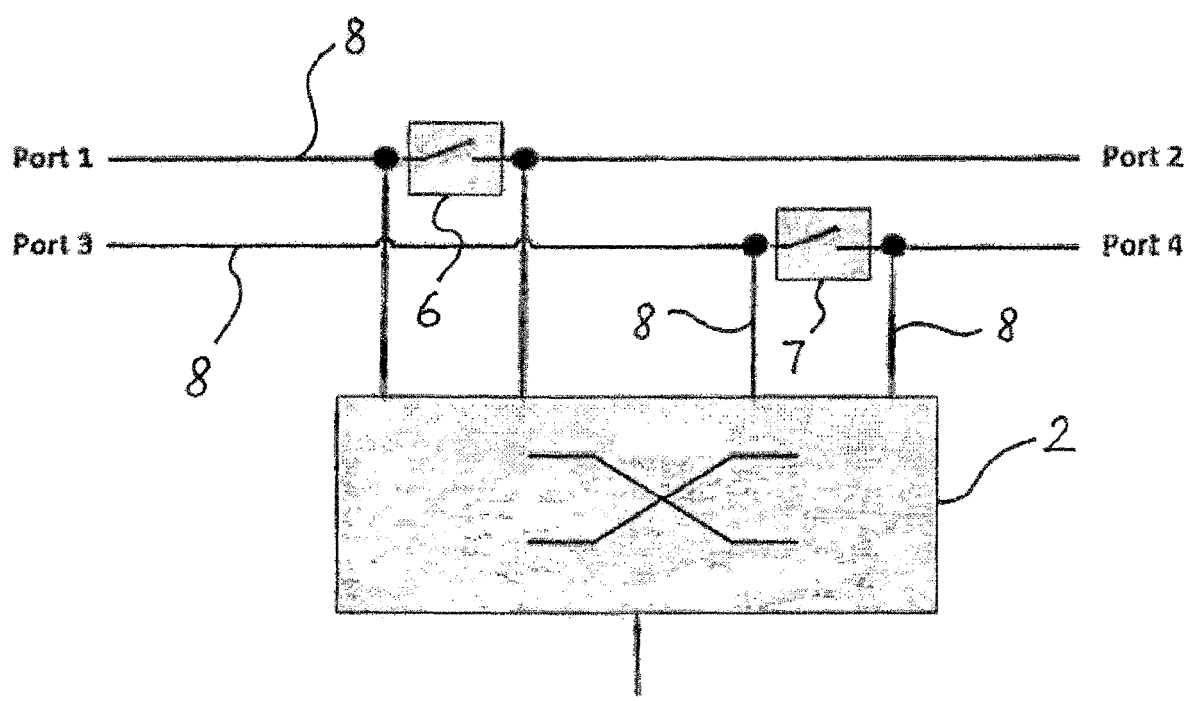
FIG. 4 is a schematic view of a detail of the network according to the invention.

FIG. 4 shows that a network device (here the network device 2) has four ports (port 1, port 2, port 3, port 4) via which this network device 2 is used on the network 1.

In order to implement the functions that are shown in FIGS. 1 to 3 and described above, the invention provides for a bypass switch 6 for bridging port 1 and port 2 as well as an additional bypass switch 7 for bridging port 3 and port 4 of the network device 2 (or also fewer or more than two bypass switches than in this embodiment). Therefore, as described in connection with FIGS. 1 to 3, if one of the network devices (which need not necessarily always be the network device 2) malfunctions, the bypass switches 6, 7 are immediately actuated in order to short-circuit the connected ports. This effectively and advantageously prevents the data ring from being interrupted until a new network device has been activated as master. The bypass time until another network device has been activated as the master can thus be advantageously and substantially reduced and redundancy maintained for the other devices. It is true that this entails tolerating the fact for a short time that the data ring of the network 1 is completely closed and data packets might circulate in an endless loop. However, since this is only briefly possible, namely until the two bypass switches 6, 7 are opened again, this can be accepted for the purpose of implementing an extremely short switching time from the old active but malfunctioning master to the use of the new master.

The bypass switches 6, 7 short-circuit the respective line 8 as soon as the current drops out and open again when the malfunctioning network device has completely booted. During normal operation, the bypass switches 6, 7 are open.

The invention claimed is:

1. A method of operating a network having a plurality of network devices, the method comprising the steps of:

interconnecting the devices in a ring topology via two lines;

operating one of the devices as master, the other devices being operable as master via a multimaster redundancy protocol implemented as a device-level ring protocol;

providing a physical switch in each of the lines at each device and at each of the ports connected such that in a closed position the respective line is bypassed around the respective device and in an open position the respective line is connected through the respective device in the ring topology;

when one of the network devices malfunctions carrying out the steps of immediately closing the switches of the malfunctioning network device and, if the malfunctioning device is the master, operating one of the other devices in the ring topology as master, and thereafter opening the switches of the malfunctioning network device without reinstating the malfunctioning network device as master; and when current drops for one of the network devices forcing reboot thereof, closing the switches of the respective lines and opening the respective switches again when the one network device has completely rebooted.

2. The method defined in claim 1, wherein the network is implemented as a multi-master redundancy process that is in turn implemented as a device-level ring process.

* * * * *